United States Patent
Musick et al.

(10) Patent No.: US 8,741,257 B2
(45) Date of Patent: *Jun. 3, 2014

(54) PROCESS FOR IN-SITU FORMATION OF CHLORIDES OF SILICON AND ALUMINUM IN THE PREPARATION OF TITANIUM DIOXIDE

(75) Inventors: Charles David Musick, Waverly, TN (US); Kenneth Paul Klein, Camden, TN (US)

(73) Assignee: E I du Pont de Nemours and Company, Wilmington, DE (US)

( * ) Notice: Subject to any disclaimer, the term of this patent is extended or adjusted under 35 U.S.C. 154(b) by 89 days.

This patent is subject to a terminal disclaimer.

(21) Appl. No.: 13/505,463

(22) PCT Filed: Nov. 9, 2010

(86) PCT No.: PCT/US2010/055914
§ 371 (c)(1),
(2), (4) Date: May 2, 2012

(87) PCT Pub. No.: WO2011/059938
PCT Pub. Date: May 20, 2011

(65) Prior Publication Data
US 2012/0288437 A1  Nov. 15, 2012

Related U.S. Application Data

(60) Provisional application No. 61/259,718, filed on Nov. 10, 2009, provisional application No. 61/306,659, filed on Feb. 22, 2010, provisional application No. 61/384,846, filed on Sep. 21, 2010.

(51) Int. Cl.
*C01G 23/047* (2006.01)

(52) U.S. Cl.
USPC ............................ 423/613; 423/610; 423/612

(58) Field of Classification Search
USPC .......... 423/463, 341, 343, 491, 495, 610–616
See application file for complete search history.

(56) References Cited

U.S. PATENT DOCUMENTS

| 2,488,439 | A | 11/1949 | Schaumann |
| 2,488,440 | A | 11/1949 | Schaumann |

(Continued)

FOREIGN PATENT DOCUMENTS

| DE | 2159475 | 7/1982 |
| DE | 19650500 | 6/1998 |

(Continued)

OTHER PUBLICATIONS

Seapurahman et al. "Preparation and Characterization of Tungsten-Loaded Titianium Dioxide Photocatalyst for Enhanced Dye Degradation" Journal of Hazardous Materials, Elsevier, Amsterdam, NL, vol. 176 No. 1-3 XP027105005.

(Continued)

*Primary Examiner* — Anthony J Zimmer
(74) *Attorney, Agent, or Firm* — Daphne Pinto Fickes

(57) ABSTRACT

This disclosure relates to a process for producing titanium dioxide, comprising: a) reacting a alloy comprising silicon and aluminum having a melting point of about 482° C. to about 660° C., with chlorine gas at temperatures above 190° C. to form chlorides of silicon and aluminum; b) adding titanium tetrachloride to the chlorides of silicon and aluminum of step (a); c) oxidizing the chlorides of silicon and aluminum and titanium tetrachloride of step (b); and d) forming titanium dioxide.

20 Claims, 1 Drawing Sheet

(56) References Cited

U.S. PATENT DOCUMENTS

| | | |
|---|---|---|
| 2,559,638 A | 7/1951 | Krchma |
| 2,833,627 A | 5/1958 | Krchma |
| 3,208,866 A | 9/1965 | Lewis et al. |
| 3,341,283 A | 9/1967 | Cleaver et al. |
| 3,343,911 A | 9/1967 | Eisenlohr |
| 3,356,456 A | 12/1967 | Wilson |
| 3,378,338 A | 4/1968 | Derham et al. |
| 3,434,799 A | 3/1969 | Wilson |
| 3,485,583 A | 12/1969 | Wilson |
| 3,505,091 A | 4/1970 | Santos |
| 3,642,442 A | 2/1972 | Hoekje et al. |
| 4,460,655 A | 7/1984 | Jacobson |
| 5,204,083 A * | 4/1993 | Magyar et al. .............. 423/613 |
| 5,545,476 A | 8/1996 | O'Dell et al. |
| 6,328,944 B1 | 12/2001 | Mangold et al. |
| 6,855,635 B2 | 2/2005 | Schumacher et al. |
| 6,881,782 B2 | 4/2005 | Crater et al. |
| 6,974,566 B2 | 12/2005 | Sabacky et al. |
| 7,232,556 B2 | 6/2007 | Yadav |
| 7,265,235 B2 | 9/2007 | Auner |
| 7,449,245 B2 | 11/2008 | Akarsu et al. |
| 7,476,378 B2 | 1/2009 | Subramanian et al. |
| 2004/0025749 A1 | 2/2004 | Drews-Nicolai et al. |
| 2004/0137254 A1 | 7/2004 | Schulz |
| 2005/0183634 A1 | 8/2005 | Schumacher et al. |
| 2006/0263291 A1 | 11/2006 | Torardi |
| 2007/0175364 A1 | 8/2007 | Blumel et al. |
| 2007/0175365 A1 | 8/2007 | Drews-Nicolai et al. |
| 2007/0298059 A1 | 12/2007 | Tiedemann et al. |
| 2008/0064592 A1 | 3/2008 | Kim et al. |
| 2008/0075654 A1 * | 3/2008 | Jamison .............. 423/613 |
| 2008/0241640 A1 | 10/2008 | Rajeshwar et al. |
| 2008/0267852 A1 | 10/2008 | Schumacher et al. |
| 2010/0226851 A1 | 9/2010 | Kim et al. |

FOREIGN PATENT DOCUMENTS

| | | |
|---|---|---|
| EP | 1553054 A1 | 7/2005 |
| EP | 2186561 A1 | 5/2010 |
| GB | 760644 | 11/1956 |
| GB | 1358224 | 7/1972 |
| JP | 04130011 | 5/1992 |
| JP | 04170312 | 6/1992 |
| WO | WO02079572 | 10/2002 |
| WO | WO2005/113442 | 12/2005 |
| WO | WO2007/129903 | 11/2007 |

OTHER PUBLICATIONS

Hathway T et al, "Photocatalytic Degradation Using Tungsten-Modified TIO2 and Visible Light: Kinetic and Mechanistic Effects Using Multiple Catalyst Doping Strategies" Journal of Photochemistry and Photobiology, A: Chemistry, Elsevier Sequoia Lausanne, CH. vol. 207, No. 203, XP026614075.

C.R. Martens, R.E. Kreiger Publishing Co., p. 515, 1974, "Emulsion Paints".

C.R. Martens, "Emulsion and Water-Soluble Paints and Coatings" (Reinhold Publishing Cor., New York, NY 1965 pp. 1-15.

International Search Repport Jan. 3, 2011.

* cited by examiner

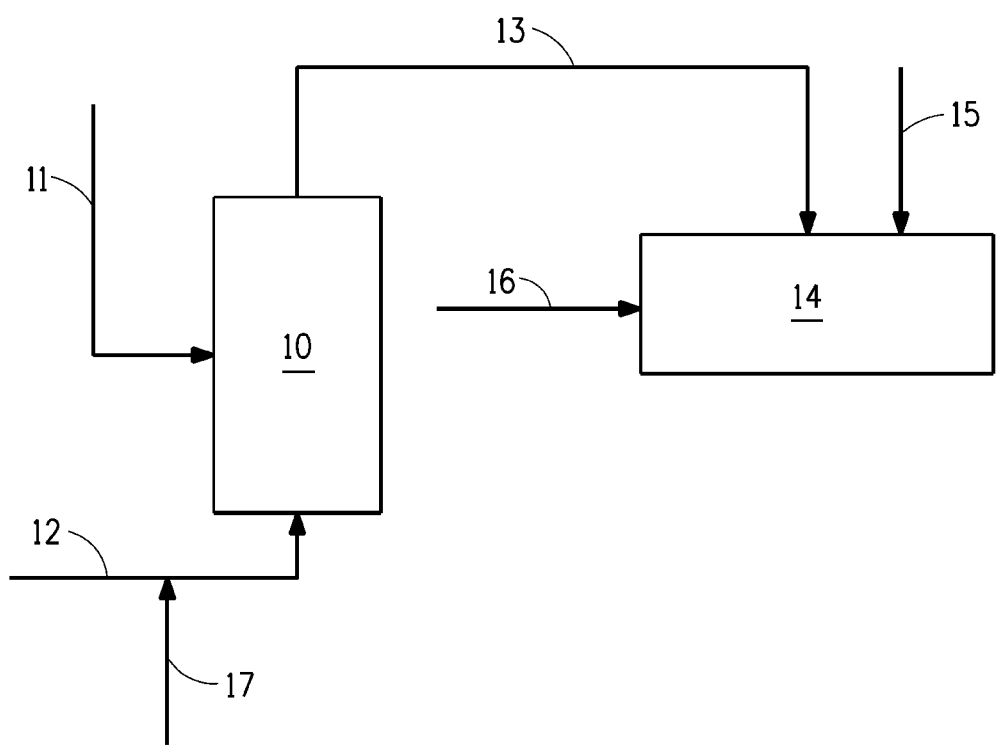

PROCESS FOR IN-SITU FORMATION OF CHLORIDES OF SILICON AND ALUMINUM IN THE PREPARATION OF TITANIUM DIOXIDE

BACKGROUND OF THE DISCLOSURE

1. Field of the Disclosure

The present disclosure relates to a process for preparing titanium dioxide, and in particular to the in-situ formation of chlorides of silicon such as silicon tetrachloride and chlorides of aluminum such as aluminum trichloride in the preparation of titanium dioxide.

2. Background of the Disclosure

Titanium dioxide pigments are prepared using either the chloride process or the sulfate process. In the preparation of titanium dioxide pigments by the vapor phase chloride process, titanium tetrachloride, $TiCl_4$, is reacted with an oxygen containing gas at temperatures ranging from about 900° C. to about 1600° C., the resulting hot gaseous suspension of $TiO_2$ particles and free chlorine is discharged from the reactor and must be quickly cooled below about 600° C., for example, by passing it through a conduit, i.e., flue, where growth of the titanium dioxide pigment particles and agglomeration of said particles takes place.

It is known to add various substances, such as silicon compounds and aluminum compounds, to the reactants in order to improve the pigmentary properties of the final product. Aluminum trichloride added during the process has been found to increase rutile in the final product, and silicon tetrachloride that becomes silica in the final product has been found to improve carbon black undertone, CBU, particle size and pigment abrasion.

U.S. Pat. No. 3,434,799 discloses the use of silicon metal in the production of $TiO_2$; however, experience of adding silicon metal in the $AlCl_3$ generator shows poor kinetics for the conversion of silicon to $SiCl_4$. For direct addition of silicon metal to the $TiO_2$ reactor, it would require a very finely divided silicon metal which would be expensive to produce and create a fire or explosion hazard.

U.S. Pat. No. 3,642,442 discloses a method for adding aluminum and silicon to the process by generating a gaseous plasma and discharging particles to the process oxygen stream. A shortcoming of this patent is that the electrodes have a limited life and must be replaced on a routine basis requiring the $TiO_2$ process to be shut down.

The transport, storage and handling of silicon tetrachloride creates issues because the material is highly toxic and silicon tetrachloride handling equipment adds costs to the process.

A need exists for a low cost approach for adding silicon tetrachloride to the process without the need for transportation of a highly toxic material, special processing equipment and expensive silicon tetrachloride facilities. A need also exists for a process wherein the feed to the $AlCl_3$ generator can be continuous with no shutdown required for maintenance on the electrodes or equipment.

SUMMARY OF THE DISCLOSURE

In a first aspect, the disclosure provides a process for producing titanium dioxide, comprising:

a) reacting an alloy comprising silicon and aluminum that has a melting point of about 482° C. to about 660° C., with chlorine gas at temperatures above 190° C. to form chlorides of silicon and aluminum;

b) adding titanium tetrachloride to the chlorides of silicon and aluminum of step (a);

(c) oxidizing the chlorides of silicon and aluminum and titanium tetrachloride of step (b); and (d) forming titanium dioxide.

By "alloy" we mean a substance made by melting two or more elements together, at least one of them being a metal. An alloy crystallizes upon cooling into a solid solution, a homogeneous mixture, or an intermetallic compound.

In the first aspect, the disclosure provides a process wherein the titanium tetrachloride is present in step (a).

In the first aspect, the disclosure provides a process wherein the wherein steps (a) and (b) are combined.

In the first aspect, the disclosure provides for titanium tetrachloride being present in a major amount in step (c).

In the first aspect, the disclosure provides a process wherein the alloy comprising silicon and aluminum has a melting point of about 620° C. to about 660° C.

In the first aspect, the disclosure provides a process wherein the alloy comprising silicon and aluminum comprises about 4% to about 22% silicon.

In the first aspect, the disclosure provides titanium dioxide comprising a treatment of silicon dioxide and aluminum dioxide. The silicon dioxide and aluminum dioxide are present on the surface of the titanium dioxide.

BRIEF DESCRIPTION OF THE DRAWING

FIG. 1 is a schematic illustration showing the process for preparing titanium dioxide ($TiO_2$).

DETAILED DESCRIPTION OF THE DISCLOSURE

In the process of vapor phase oxidation of titanium tetrachloride to form titanium dioxide pigment treated with silicon dioxide and aluminum oxide, chlorides of silicon such as silicon tetrachloride and chlorides of aluminum such as aluminum trichloride are formed in-situ by reacting a alloy comprising silicon and aluminum having a melting point of about 482° C. to about 660° C., typically a melting point of about 620° C. to about 660° C., with chlorine gas at temperatures above 190° C., typically about 300° C. to about 600° C., optionally in the presence of titanium tetrachloride. Some suitable alloys comprising silicon and aluminum include alloy 4004, alloy 4008, or any alloy comprising silicon and aluminum that is low in impurities that are detrimental to pigment color. Alloy 4004 comprises Aluminum: 86%-90%, Copper: <0.25%, Iron: <0.8%, Magnesium: 1%-2%, Manganese: <0.1%, Other (each): <0.05%, Other (total): <0.15%, Silicon: 9-10.5%, and Zinc: <0.2%. Alloy 4008 comprises: Aluminum: 91.5-93.2%, Beryllium: <0.0008%, Copper: <0.05%, Iron: <0.09%, Magnesium: 0.3-0.45%, Manganese: <0.05%, Other each): <0.05%, Other (total): <0.15%, Silicon: 6.5%-7.5%, Titanium: 0.04-0.15% and Zinc: <0.05%. Typically, the alloy comprising silicon and aluminum comprises about 4% to about 22% silicon, and more typically about 6% to about 18% silicon.

As shown in FIG. 1, the alloy comprising silicon and aluminum 11 and chlorine 12 are added to the generator 10. This reaction can occur in fluidized beds, spouting beds, packed beds, or plug flow reactors. The inert generator bed may comprise materials such as silica sand, glass beads, ceramic beads, $TiO_2$ particles, or other inert mineral sands. The reaction may occur in the presence of neucleating salts such as potassium chloride, rubidium chloride, or cesium chloride.

The alloy comprising silicon and aluminum 11 reacts in the generator 10 according to the following equations:

$$SiAl_2 \rightarrow Si + Al_2$$

$$2Al + 3Cl_2 \rightarrow 2AlCl_3 + heat$$

$$Si + 2Cl_2 \rightarrow SiCl_4 + heat$$

The heat of reaction from the chlorination of the aluminum metal helps provide sufficient heat to drive the kinetics of the reaction between chlorine and silicon.

Titanium tetrachloride 17 may be present during this reaction to absorb the heat of reaction. The chlorides formed in the in-situ step, 13, comprise chlorides of silicon such as silicon tetrachloride and chlorides of aluminum such as aluminum trichloride. Typical amounts of the alloy comprising silicon and aluminum having a melting point of about 482° C. to about 660° C. are about 0.1% to about 5%, more typically about 0.2% to about 1.5%, by weight, based on the total amount of all reactants. Typical amounts of chlorine used in step (a) are about 0.4% to about 20%, more typically about 2% to about 5%, by weight, based on the total amount of all reactants. Typical amounts of titanium tetrachloride are about 75% to about 99.5%, more typically about 93% to about 98%, by weight, based on the total amount of all reactants.

The chlorides, 13, formed in the in-situ step flow into an oxidation reactor 14 and titanium tetrachloride 15 is then added to the chlorides, such that titanium tetrachloride is present in a major amount. Vapor phase oxidation of titanium tetrachloride is disclosed, for example, in U.S. Pat. Nos. 2,488,439, 2,488,440, 2,559,638, 2,833,627, 3,208,866, 3,505,091, and 7,476,378. The reaction may occur in the presence of neucleating salts such as potassium chloride, rubidium chloride, or cesium chloride.

Such reaction usually takes place in a pipe or conduit, wherein oxygen 16, titanium tetrachloride 15 and the in-situ formed chlorides comprising chlorides of silicon such as silicon tetrachloride and chlorides of aluminum such as aluminum trichloride 13 are introduced at a suitable temperature and pressure for production of the titanium dioxide. In such a reaction, a flame is generally produced.

Downstream from the flame, the titanium dioxide produced is fed through an additional length of conduit wherein cooling takes place. For the purposes herein, such conduit will be referred to as the flue. The flue should be as long as necessary to accomplish the desired cooling. Typically, the flue is water cooled and can be about 50 feet (15.24 m) to about 3000 feet (914.4 m), typically about 100 feet (30.48 m) to about 1500 feet (457.2 m), and most typically about 200 feet (60.96 m) to 1200 feet (365.76 m) long.

EXAMPLES

Example 1 (Comparative Example 1)

Aluminum metal (>99.5% purity) was fed to an aluminum chloride generator where it reacted in the presence of titanium tetrachloride and excess chlorine gas to form a mixture of aluminum trichloride, titanium tetrachloride and chlorine at a temperature of 410 C. This mixture was fed to an oxidation reactor where it reacted to form pigmentary $TiO_2$ comprising 1.1% $Al_2O_3$. The background concentration of $SiCl_4$ in the $TiCl_4$ supplied from the purification area was sufficient to produce 0.06% $SiO_2$ on the oxidation base.

Example 2 (Comparative Example 2)

The process in Example 1 was repeated except that separate silicon metal particles with a size between 12 mesh and ⅜" were fed to the aluminum chloride generator in addition to the aluminum feed. The silicon metal was fed at a rate sufficient to increase the $SiO_2$ concentration of the oxidation base by 0.15% $SiO_2$. However, the $SiO_2$ concentration on the oxidation base only rose from 0.06% $SiO_2$ to 0.10% $SiO_2$. One hour after silicon metal feed to the $AlCl_3$ generator stopped, the process was shut down and the $AlCl_3$ generator bed was drained. Unreacted silicon metal was still present in the $AlCl_3$ generator.

Example 3

Example 1 was repeated with the following exceptions: The aluminum source was changed to a silicon-aluminum alloy (alloy 4008) containing ~7% elemental silicon and the background level of SiCl4 in the TiCl4 supplied from purification was 0.05%. The $SiO_2$ level of the oxidation base rose from 0.05% $SiO_2$ to 0.14% $SiO_2$ indicating the full chlorination of the silicon and aluminum in the aluminum alloy.

What is claimed is:
1. A process for producing titanium dioxide, comprising:
   a) reacting an alloy comprising silicon and aluminum having a melting point of about 482° C. to about 660° C., with chlorine gas at a temperature above 190° C. to form chlorides of silicon and aluminum;
   b) adding titanium tetrachloride to the chlorides of silicon and aluminum of step (a);
   c) oxidizing the chlorides of silicon and aluminum and titanium tetrachloride of step (b); and
   d) forming titanium dioxide.

2. The process of claim 1 wherein titanium tetrachloride is present in step (a).

3. The process of claim 1 wherein chlorides of silicon and aluminum are silicon tetrachloride and aluminum trichloride.

4. The process of claim 1 wherein the alloy comprising silicon and aluminum has a melting point of about 620° C. to about 660° C.

5. The process of claim 1 wherein the alloy comprising silicon and aluminum comprises about 4% to about 22% silicon.

6. The process of claim 4 wherein the alloy comprising silicon and aluminum comprises about 6% to about 18% silicon.

7. The process of claim 1 wherein the temperature is about 300° C. to about 600° C.

8. The process of claim 1 wherein the alloy comprising silicon and aluminum is alloy 4004.

9. The process of claim 1 wherein the alloy comprising silicon and aluminum is alloy 4008.

10. The process of claim 1 wherein the reaction in step (a) occurs in a reactor selected from the group consisting of a fluidized bed reactor, spouting bed reactor, packed bed reactor, and a plug flow reactor.

11. The process of claim 10 wherein the reactor comprises materials selected from the group consisting of silica sand, glass beads, ceramic beads, and $TiO_2$ particles.

12. The process of claim 10 wherein the reaction in step (a) occurs in the presence of nucleating salts.

13. The process of claim 12 wherein the nucleating salts are selected from the group consisting of potassium chloride, rubidium chloride, and cesium chloride.

14. The process of claim 1 wherein the amount of alloy comprising silicon and aluminum is about 0.1% to about 5% by weight, based on the total amount of all reactants in step (a) and step (b).

15. The process of claim 14 wherein the amount of alloy comprising silicon and aluminum is about 0.2% to about 1.5% by weight, based on the total amount of all reactants in step (a) and step (b).

16. The process of claim 1 wherein the amount of chlorine is about 0.4% to about 20% by weight, based on the total amount of all reactants in step (a) and step (b).

17. The process of claim 16 wherein the amount of chlorine is about 2% to about 5% by weight, based on the total amount of all reactants in step (a) and step (b).

18. The process of claim 1 wherein the amount of titanium tetrachloride is about 75% to about 99.5% by weight, based on the total amount of all reactants in step (a) and step (b).

19. The process of claim 18 wherein the amount of titanium tetrachloride is about 93% to about 98% by weight, based on the total amount of all reactants in step (a) and step (b).

20. The process of claim 1 wherein the titanium dioxide comprises a treatment of silicon dioxide and aluminum oxide.

\* \* \* \* \*